(12) United States Patent
Shibata et al.

(10) Patent No.: US 10,315,534 B2
(45) Date of Patent: Jun. 11, 2019

(54) WORK VEHICLE

(71) Applicant: Kubota Corporation, Osaka-shi (JP)

(72) Inventors: Takashi Shibata, Sakai (JP); Shoichiro Nagaishi, Sakai (JP); Tomohisa Yamamoto, Sakai (JP); Takeshi Komorida, Sakai (JP); Takashi Kumashiro, Sakai (JP); Azusa Furihata, Sakai (JP); Akihito Mihara, Sakai (JP); Tatsuki Kago, Sakai (JP); Yoshihisa Tonoya, Sakai (JP)

(73) Assignee: Kubota Corporation, Osaka (JP)

( * ) Notice: Subject to any disclaimer, the term of this patent is extended or adjusted under 35 U.S.C. 154(b) by 32 days.

(21) Appl. No.: 15/612,068

(22) Filed: Jun. 2, 2017

(65) Prior Publication Data

US 2018/0134183 A1   May 17, 2018

(30) Foreign Application Priority Data

Nov. 16, 2016   (JP) .................................. 2016-223371

(51) Int. Cl.
*B60N 2/14* (2006.01)
*B60N 2/38* (2006.01)
*E02F 3/96* (2006.01)
*E02F 9/16* (2006.01)
*B60R 21/13* (2006.01)

(52) U.S. Cl.
CPC ............. *B60N 2/146* (2013.01); *B60N 2/143* (2013.01); *B60N 2/38* (2013.01); *B60R 21/131* (2013.01); *E02F 3/964* (2013.01); *E02F 9/166* (2013.01)

(58) Field of Classification Search
CPC .......... B60N 2/143; B60N 2/146; B60N 2/38; E02F 3/32; E02F 9/166; E02F 3/964; B60R 21/131
See application file for complete search history.

(56) References Cited

U.S. PATENT DOCUMENTS

| 2,946,373 | A | * | 7/1960 | McCanse | B60N 2/143 248/421 |
| 3,860,283 | A | * | 1/1975 | Colautti | B60N 2/146 248/425 |
| 5,127,699 | A | * | 7/1992 | Maezawa | B60N 2/143 180/326 |
| 6,446,367 | B1 | * | 9/2002 | Muramoto | E02F 3/627 172/275 |

(Continued)

FOREIGN PATENT DOCUMENTS

| EP | 0317520 A2 * | 5/1989 | ............ B60N 2/143 |
| JP | 01195148 A * | 8/1989 | |

(Continued)

*Primary Examiner* — Laura Freedman
(74) *Attorney, Agent, or Firm* — The Webb Law Firm

(57) ABSTRACT

Provided is a work vehicle having a rollover protection structure (ROPS) around a driver's seat which is switchable between a front seating posture and a rear seating posture. A locking mechanism locks the driver's seat to the rear seating posture. The locking mechanism includes a hook provided on the driver's seat side, a hook rod disposed between a left strut and a right strut and engageable with the hook when the driver's seat is switched to the rear seating posture, and a rod bracket for supporting the hook rod. The rod bracket is provided separately from the left strut and the right strut.

7 Claims, 12 Drawing Sheets

(56) References Cited

U.S. PATENT DOCUMENTS

| | | | | |
|---|---|---|---|---|
| 6,637,136 B2 * | 10/2003 | Aoki | ................ | E02F 3/627 |
| | | | | 37/468 |
| 6,729,431 B2 * | 5/2004 | Osuga | ................ | B62D 21/186 |
| | | | | 180/312 |
| 7,001,134 B2 * | 2/2006 | Aoki | ................ | B62D 49/02 |
| | | | | 172/272 |
| 7,682,124 B2 * | 3/2010 | Miyazaki | ................ | E02F 3/384 |
| | | | | 414/694 |
| 8,690,221 B2 * | 4/2014 | Kimura | ................ | E02F 9/166 |
| | | | | 296/65.06 |
| 9,579,994 B2 * | 2/2017 | Muehlbauer | ................ | B60N 2/143 |
| 9,725,016 B2 * | 8/2017 | Hyder | ................ | B60N 2/502 |

FOREIGN PATENT DOCUMENTS

| | | | | |
|---|---|---|---|---|
| JP | 061352770 A | * | 5/1994 | |
| JP | 06219193 A | * | 8/1994 | |
| JP | 2000225876 A | * | 8/2000 | |
| JP | 200325886 A | | 1/2003 | |

\* cited by examiner

WORK VEHICLE

CROSS-REFERENCE TO RELATED APPLICATION

This application claims priority to Japanese Patent Application No. 2016-223371 filed Nov. 16, 2016, the disclosure of which is hereby incorporated in its entirety by reference.

BACKGROUND OF THE INVENTION

1. Field of the Invention

The invention is in general related to a work vehicle such as a tractor; and in particular a work vehicle including a driver's seat switchable between a front seating posture and a rear seating posture, a rollover protection structure or system (ROPS) provided around the driver's seat, and a locking mechanism configured to lock the driver's seat to the rear seating posture.

2. Description of Related Art

For instance, a work vehicle (a tractor) disclosed in JP2003-025886A includes a driver's seat switchable between a front seating posture (a front inclined posture) in which a driver is seated as facing a vehicle body front side and a rear seating posture (a rear inclined posture) in which the driver is seated as facing a vehicle body rear side; a ROPS provided around the driver's seat; and a locking mechanism (a fixing device) capable of locking the driver's seat to the rear seating posture.

The locking mechanism includes a hook (a locking pawl) provided on the driver's seat side, a hook rod (a rear fixing member) engageable with the hook when the driver's seat is switched to the rear seating posture), and a rod bracket (a connecting plate) for supporting the hook rod. With this arrangement, when the driver's seat is switched to the rear seating posture, with engagement of the hook with the hook rod, the driver's seat can be locked to the rear seating posture.

With this tractor, the rod bracket is provided integrally with the ROPS between a left strut and a right strut of the ROPS. Therefore, at the time of assembly, the ROPS needs to be handled together with the rod bracket, so that handling of the ROPS is troublesome.

In view of the above, there is a need for a work vehicle that improves handling readiness of the ROPS at the time of assembly.

SUMMARY OF THE INVENTION

In view of the above, a work vehicle is provide as under, comprising:
 a traveling vehicle body having a vehicle body frame;
 a driver's seat mounted on the traveling vehicle body, and configured to be switchable between a front seating posture in which a driver is seated as facing a vehicle body front side and a rear seating posture in which the driver is seated as facing a vehicle body rear side;
 a rollover protection structure (ROPS) fixed to the vehicle body frame around the driver's seat, the ROPS having a left strut provided on a left side of the driver's seat to extend upwards and a right strut provided on a right side of the driver's seat to extend upwards; and
 a locking mechanism configured to lock the driver's seat to the rear seating posture, the locking mechanism including a hook provided on the driver's seat side, a hook rod disposed between the left strut and the right strut and engageable with the hook when the driver's seat is switched to the rear seating posture, and a rod bracket for supporting the hook rod;
 wherein the rod bracket is provided separately from the left strut and the right strut.

With this arrangement, the rod bracket is provided separately from the left strut and the right strut. Thus, at the time of assembly, the ROPS can be handled independently of the rod bracket. With this, handling readiness of the ROPS at the time of assembly can be improved.

According to one preferred embodiment, the vehicle body frame includes a supporting member for supporting the ROPS; and the rod bracket is supported by the supporting member. With this arrangement, the rod bracket can be supported in a reliable manner by the supporting member having high rigidity.

Preferably, the vehicle body frame includes a left vehicle body frame and a right vehicle body frame which extend in a vehicle body front/rear direction; and the supporting member is supported between the left vehicle body frame and the right vehicle body frame.

More preferably the supporting member includes a U-shaped bracket having left and right leg portions attached between the left vehicle body frame and the right vehicle body frame, and a base attached to upper ends of the left and right leg portions and supporting the rod bracket.

According to another preferred embodiment, the driver's seat is configured to move to a rear side in the vehicle body front/rear direction when the driver's seat is switched from the front seating posture to the rear seating posture; and the rod bracket has a stopper portion provided integrally therewith for restricting movement of the driver's seat to the rear side. With such arrangement, since the stopper portion is provided integrally in the rod bracket, when the driver's seat is switched from the front seating posture to the rear seating posture, it is possible to prevent the driver's seat from being moved excessively to the rear side to collide a member present in the surrounding and also to reduce the number of components.

According to still another preferred embodiment, the rod bracket is elongated in a vehicle body left/right direction; and the rod bracket includes, at each of its left and right end portions, an attaching portion for attaching the rod bracket to the vehicle body frame and a supporting portion for supporting the hook rod.

Further and other features and advantages achieved thereby will become apparent from the following description.

DETAILED DESCRIPTION OF PREFERRED EMBODIMENTS

Figure 1:
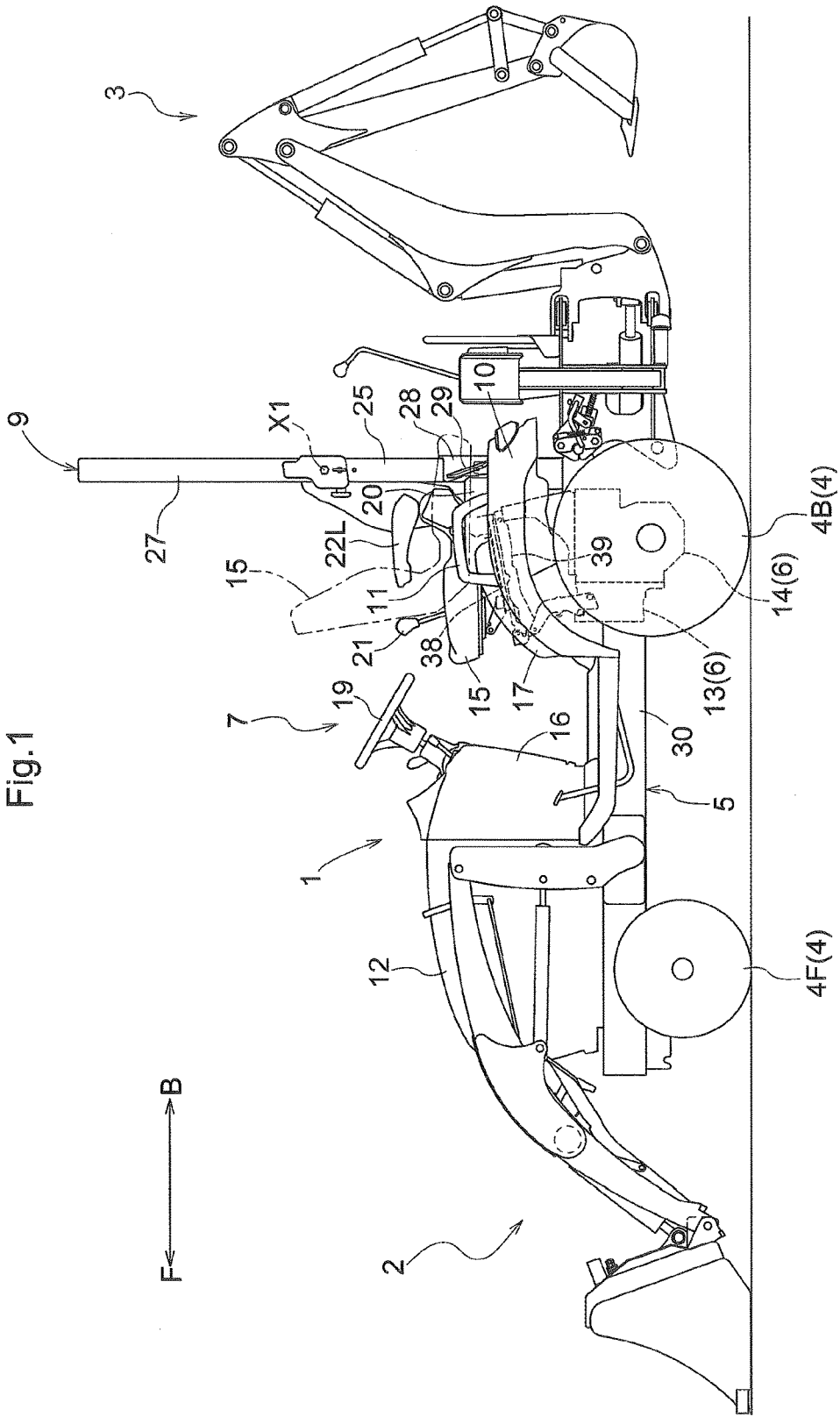
FIG. 1 is a left side view showing a tractor as an example of a work vehicle.
Figure 3:
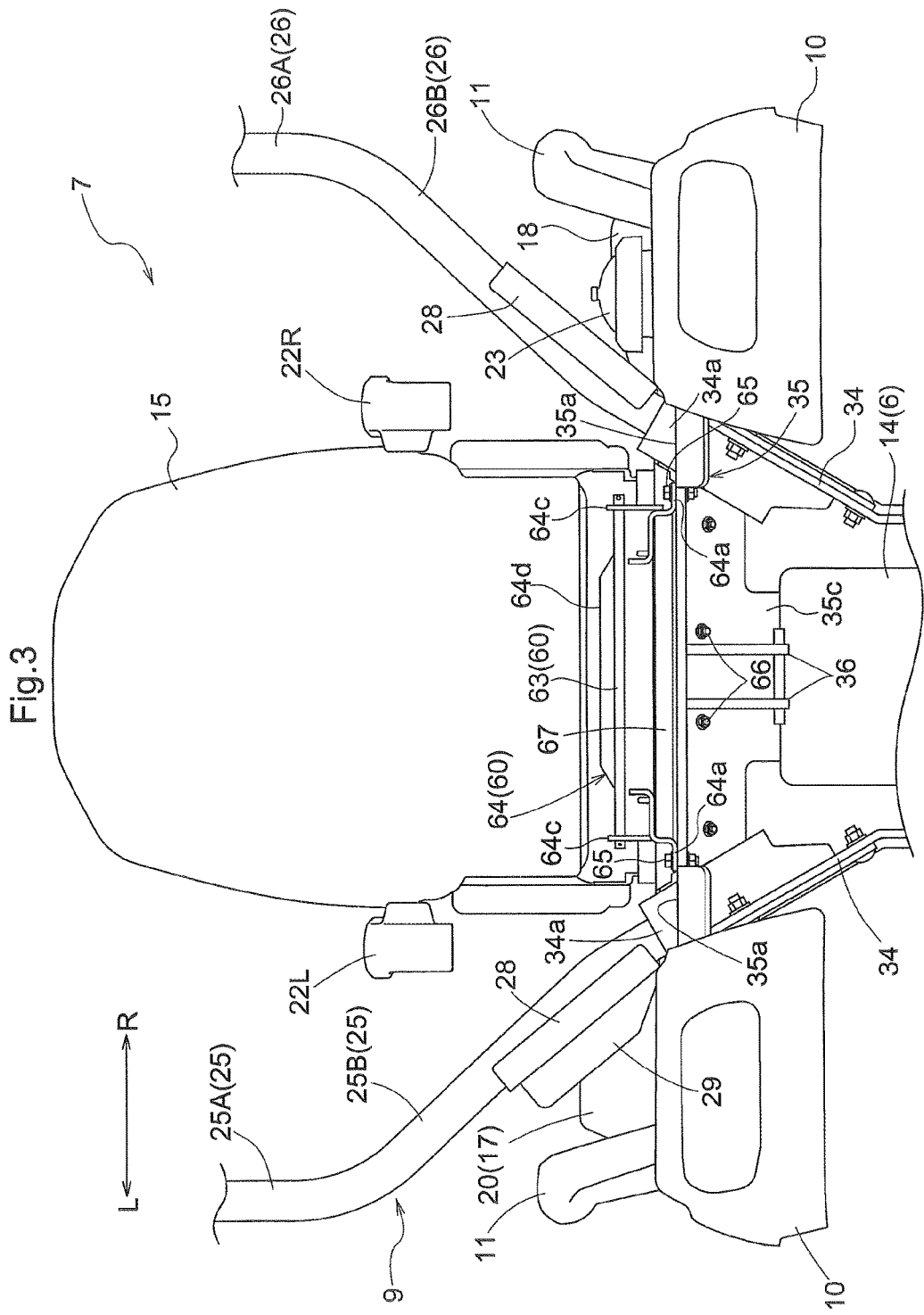
FIG. 3 is a rear view showing the rear portion of the driver's seat.

In the following description, a direction of arrow "F" shown in FIG. 1 represents "vehicle body front side", a direction of arrow "B" shown in FIG. 1 represents "vehicle body rear side, a direction of arrow "L" shown in FIG. 3 represents "vehicle body left side", and a direction of arrow "R" shown in FIG. 3 represents "vehicle body right side", respectively.

General Arrangement of Tractor

FIG. 1 shows a tractor (an example of a "work vehicle"). This tractor includes a traveling vehicle body 1, a front loader 2 and a backhoe 3 to form a loader backhoe or a backhoe loader. The traveling vehicle body 1 includes a traveling device 4, a vehicle body frame 5, an engine (not shown), a speed changing section 6, a driving section 7, a fuel tank 8 (see FIG. 4) and a rollover protection structure or system (to be referred to as "ROPS" hereinafter) 9.

The traveling device 4 includes a pair of steerable and drivable left and right front wheels 4F and a pair of drivable left and right rear wheels 4B. A pair of left and right rear fenders 10 cover the left and right rear wheels 4B, respectively. Each rear fender 10 includes a handrail 11 to be gripped by a driver when getting on/off the vehicle.

A hood 12 is provided at a front portion of the vehicle body frame 5. The engine (not shown) is accommodated inside the hood 12. To a front portion of the vehicle body frame 5, the front loader 2 is detachably attached. At a rear portion of the vehicle body frame 5, there are provided the speed changing section 6, the driving section 7 and the fuel tank 8 (see FIG. 4). To a rear portion of the vehicle body frame 5, the backhoe 3 is detachably attached.

The speed changing section 6 includes a hydrostatic stepless speed changing device (to be referred to as "HST" hereinafter) 13 to act as a main speed changing device, and a transmission case 14. A gear type speed changing device (not shown) to act as an auxiliary speed changing device, etc. are accommodated inside the transmission case 14.

Driving Section

As shown in FIGS. 1-4, the driving section 7 includes a driver's seat 15, a front panel 16, a left lever guide 17 and a right lever guide 18.

The front panel 16 is provided forwardly of the driver's seat 15. A steering wheel 19 is provided on the front panel 16 for effecting steering operations of the vehicle body. The left lever guide 17 is provided on the left side adjacent the driver's seat 15 and on the top face of the left rear fender 10. At a rear portion of the left lever guide 17, there is formed an article accommodating portion 20. The right lever guide 18 is provided on the right side adjacent the driver's seat 15 and on the top face of the right rear fender 10. The right lever guide 18 is provided with a loader lever 21 for operating the front loader 2.

The driver's seat 15 is switchable between a front seating posture in which a driver is seated as facing the vehicle body front side and a rear seating posture in which the driver is seated as facing the vehicle body rear side. When the driver is to effect a steering operation of the vehicle body or an operation of the front loader 2, the driver's seat 15 will be switched to the front seating posture. Whereas, when the driver is to effect an operation of the backhoe 3, the driver's seat 15 will be switched to the rear seating posture. In the driver's seat 15, there are provided a left armrest 22L on which the driver seated at the driver's seat 15 will rest his/her left arm and a right armrest 22R on which the driver seated at the driver's seat 15 will rest his/her right arm.

Fuel Tank

The fuel tank 8 includes a center reservoir section 8A, a left reservoir section 8B and a right reservoir section 8C. The center reservoir section 8A is disposed between the driver's seat 15 and the speed changing section 6. The left reservoir section 8B is disposed between the left rear fender 10 and the left rear wheel 4B. The right reservoir section 8C is disposed between the right rear fender 10 and the right rear wheel 4B. The right reservoir section 8C is provided with a fuel filling opening 23. Between the left reservoir section 8B and the right reservoir section 8C, there is provided a fuel tube 24 for ventilation.

ROPS

The ROPS 9 is provided around the driver's seat 15. The ROPS 9 includes a left strut 25, a right strut 26 and an arch portion 27.

The left strut 25 is provided on the left side of the driver's seat 15 to extend upwards. The left strut 25 includes an upper portion 25A extending in the vertical direction and a lower portion 25B extending obliquely to be positioned on the outer side in the vehicle body width (left/right) direction as approaching the upper portion 25A.

The right strut 26 is provided on the right side of the driver's seat 15 to extend upwards. The right strut 26 includes an upper portion 26A extending in the vertical direction and a lower portion 26B extending obliquely to be positioned on the outer side in the vehicle body width direction as approaching the upper portion 26A.

The arch portion 27 is provided between an upper end portion of the left strut 25 and an upper end portion of the right strut 26. The arch portion 27 is supported by the upper end portion of the left strut 25 and the upper end portion of the right strut 26 to be pivotable about a pivot axis X1 that extends in the vehicle body left/right direction. The arch position 27 can be maintained in position at a use position where the arch portion 27 extends upwards and at a storage position where the arch portion 27 extends rearwards.

Figure 4:
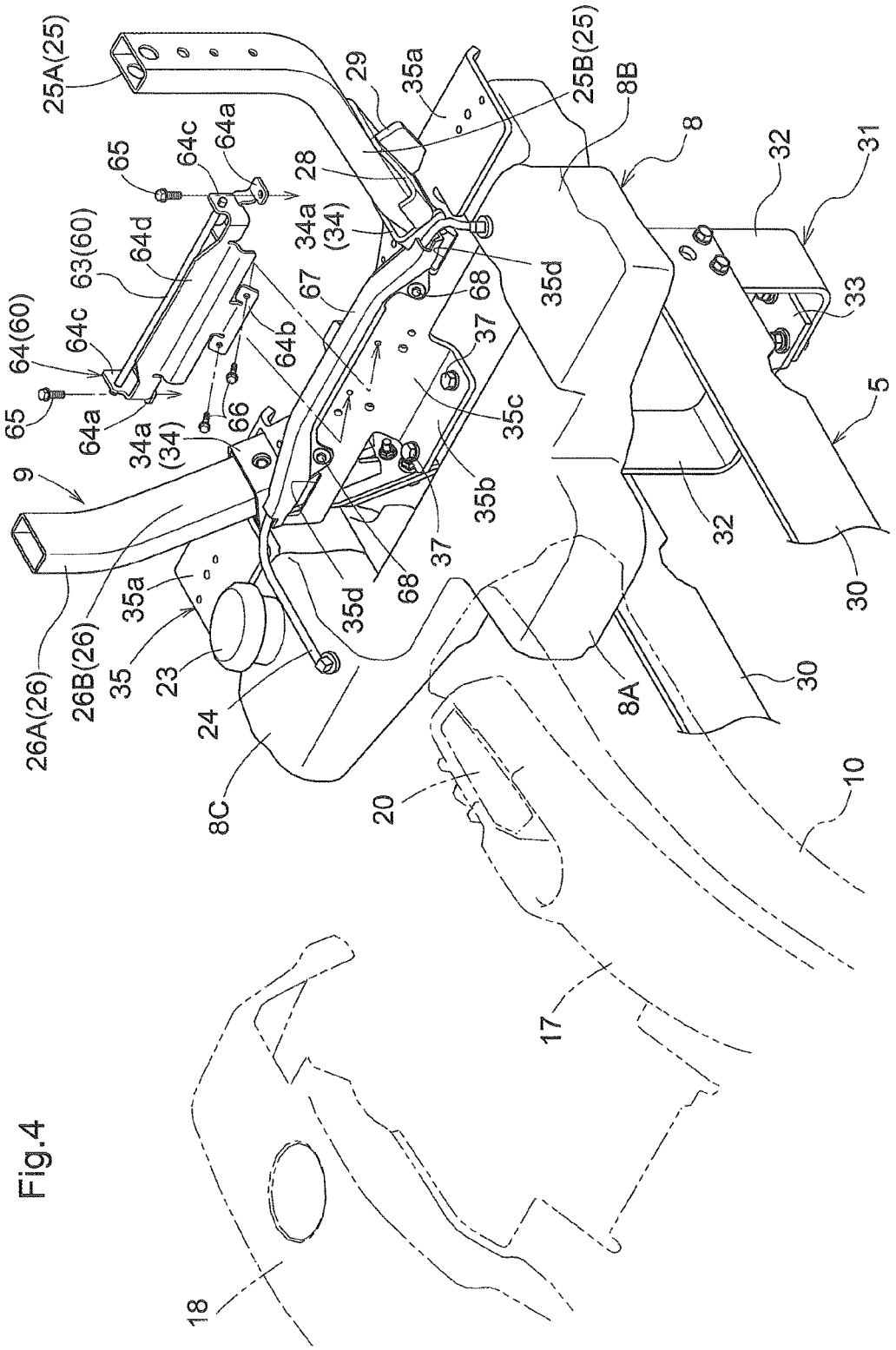
FIG. 4 is a perspective view showing a rear fender, a fuel tank, a rollover protection structure (ROPS), a top link bracket, a rod bracket, etc.
Figure 5:
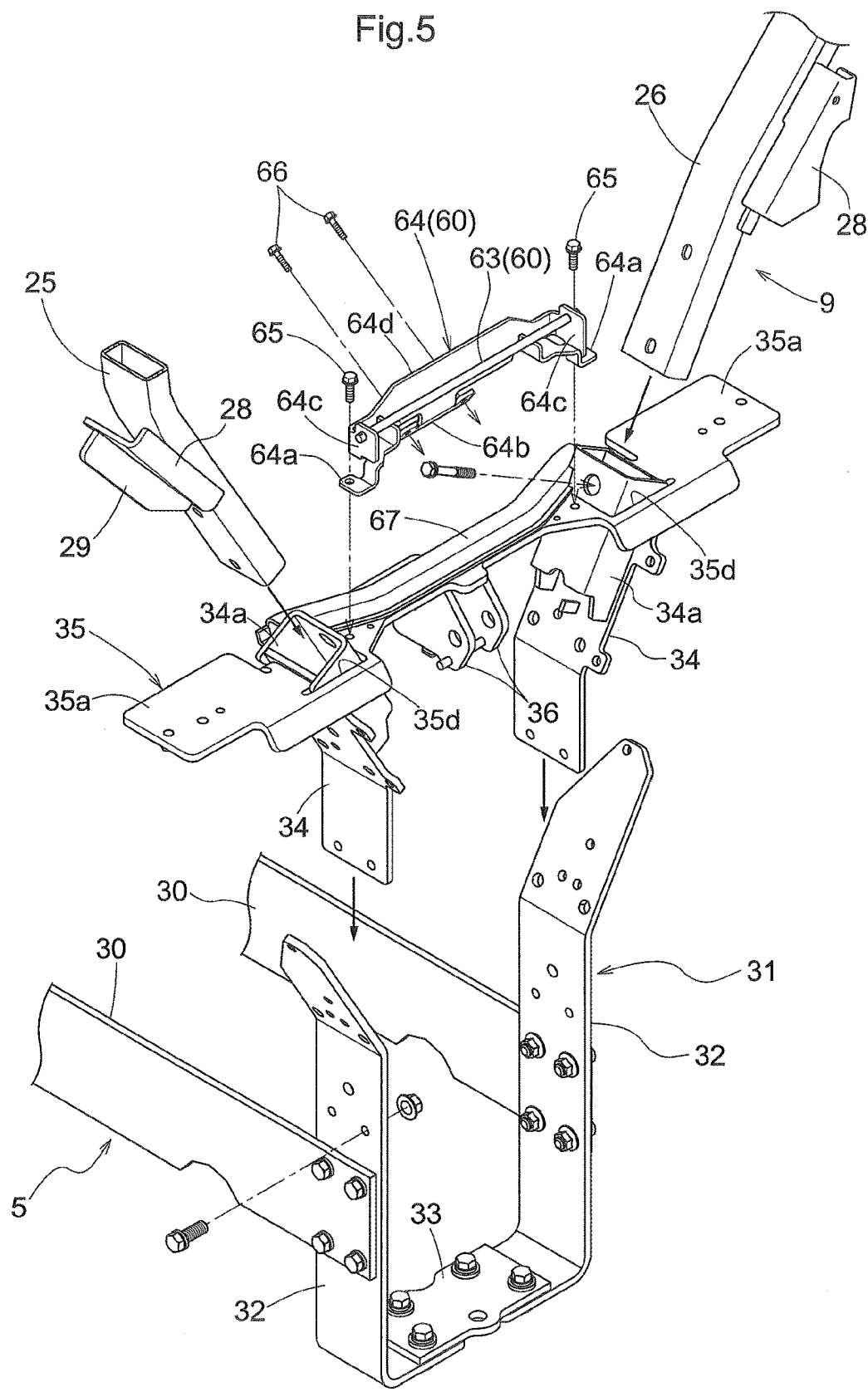
FIG. 5 is a perspective view showing the ROPS, the top link bracket, the rod bracket, etc.

As shown in FIGS. 3-5, a reinforcing plate 28 is provided on each of the lower portion 25B of the left strut 25 and the lower portion 26B of the right strut 26. A rib 29 is provided on the left reinforcing plate 28 at an outer face thereof with respect to the vehicle body width direction. The rib 29 is disposed at a position overlapped with the left lever guide 17 as seen in a rear view, on the rear side of the left lever guide 17. With this arrangement, the left strut 25 can be effectively reinforced by the rib 29. Also, it is possible to prevent an obstacle from coming into contact with the left lever guide 17 or the driver from the rear side (for instance, it is possible to prevent a tree, grass or the like from coming into contact with the left lever guide 17 or the driver at the time of reverse traveling of the vehicle body).

Vehicle Body Frame

The vehicle body frame 5 includes a pair of left and right main frames 30 and a top link bracket 31. The top link bracket 31 supports the ROPS 9, etc. The top link bracket 31 is generally U-shaped; and includes a pair of left and right lower brackets 32, a connecting plate 33, a pair of left and right upper brackets 34 and a base 35.

The left lower bracket 32 is bolt-fixed to a rear end portion of the left main frame 30. The right lower bracket 32 is bolt-fixed to a rear end portion of the right main frame 30. The connecting plate 33 is provided between the lower end portion of the left lower bracket 32 and the lower end portion of the right lower bracket 32. The connecting plate 33 is bolt-fixed to the lower end portion of the left lower bracket 32 and the lower end portion of the right lower bracket 32.

The left upper bracket 34 is bolt-fixed to an upper portion of the left lower bracket 32. The left upper bracket 34 includes an inserting portion 34a in which the lower portion 25B of the left strut 25 is to be inserted.

The right upper bracket 34 is bolt-fixed to an upper portion of the right lower bracket 32. The right upper bracket 34 includes an inserting portion 34a in which the lower portion 26B of the right strut 26 is to be inserted.

The base 35 is provided between the upper end portion of the left upper bracket 34 and the upper end portion of the right upper bracket 34. At a left/right center portion of the base 35, a connecting portion 36 is provided. To this connecting portion 36, a top link (not shown) of a link mechanism for attaching an implement (not shown) such as a rotary tiller or the like can be attached.

The base 35 includes an upper horizontal face portion 35a, a lower horizontal face portion 35b and an inclined face portion 35c. The base 35 defines a pair of left and right opening portions 35d in which the upper brackets 34 are to be inserted. The left end portion of the upper horizontal face portion 35a is located between the left rear fender 10 and the left reservoir section 8B. The right end portion of the upper horizontal face portion 35a is located between the right rear fender 10 and the right reservoir section 8C. The inclined face portion 35c inclines forwardly downwards between the upper horizontal face portion 35a and the lower horizontal face portion 35b. The opening portions 35d are formed between the upper horizontal face portion 35a and the inclined face portion 35c. The lower horizontal face portion 35b is fixed to an upper portion of the transmission case 14 with bolts 37.

Supporting Arrangement of Driver's Seat

Figure 2:
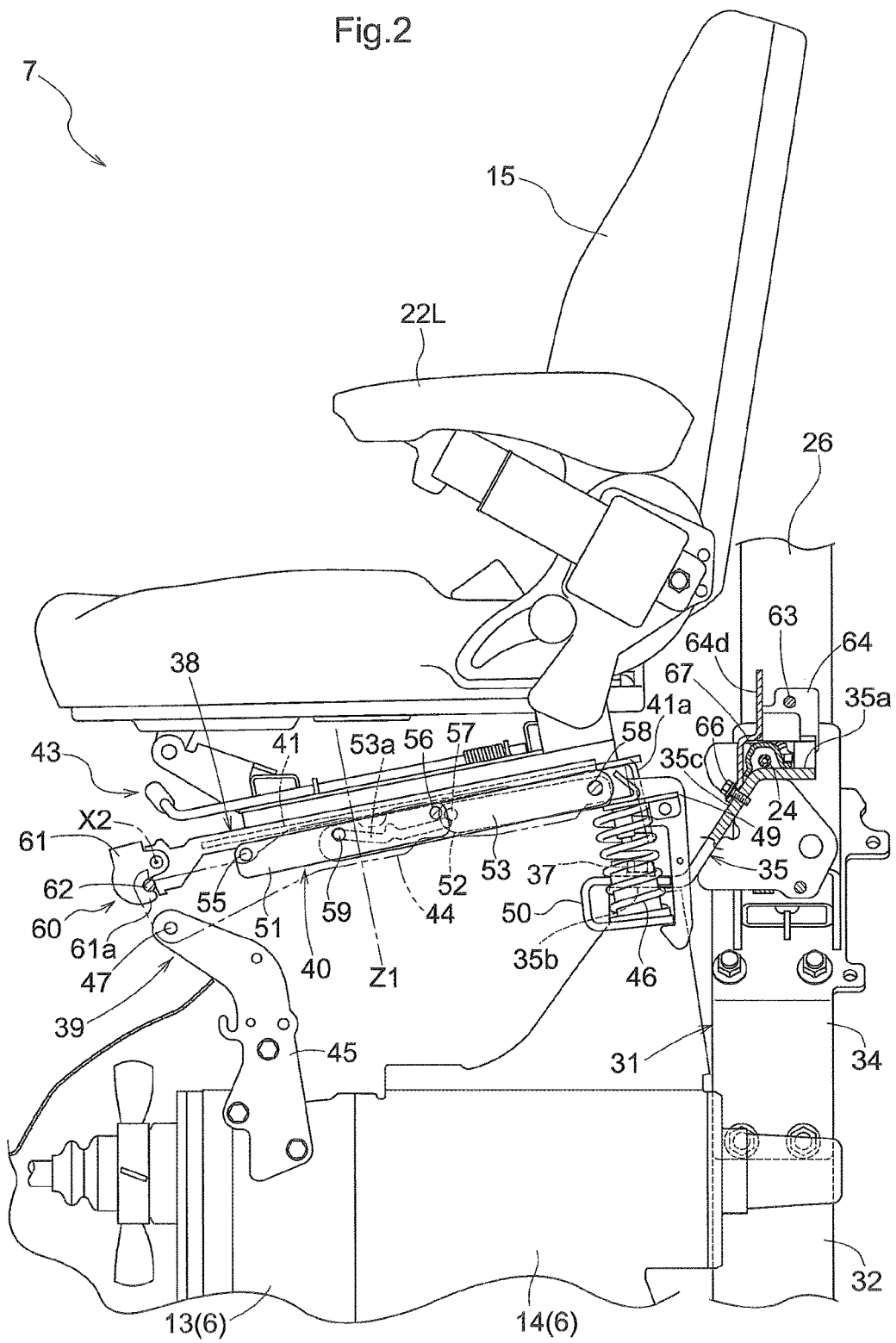
FIG. 2 is a left side view in section showing a rear portion of a driver's seat.
Figure 6:
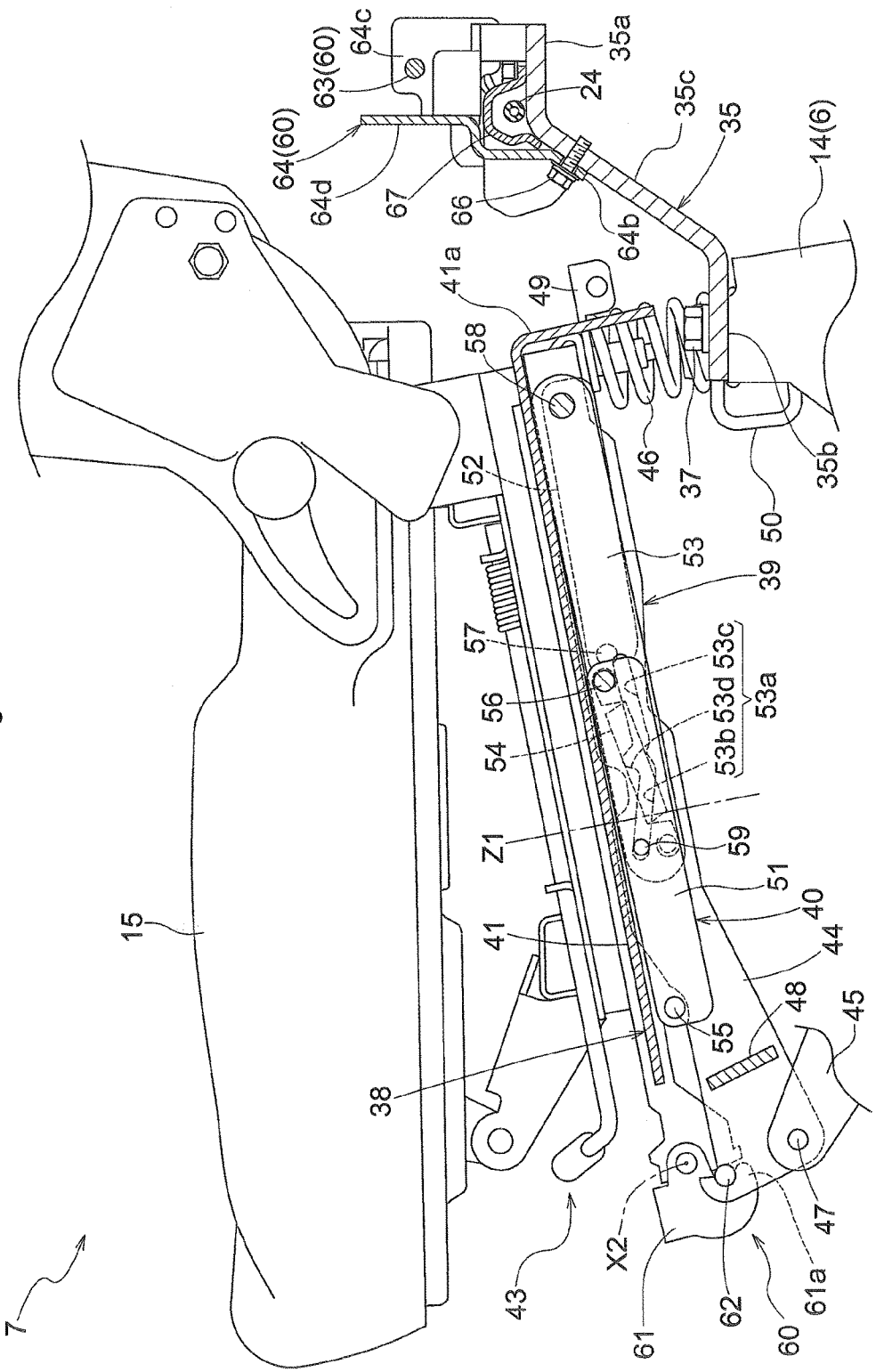
FIG. 6 is a left side view showing a supporting arrangement of the driver's seat.

As shown in FIG. 2 and FIG. 6, there are provided a rotary table 38 for rotatably supporting the driver's seat 15, a support frame 39 for elastically supporting the driver's seat 15, and a link mechanism 40 provided between the rotary table 38 and the support frame 39.

Figure 9:
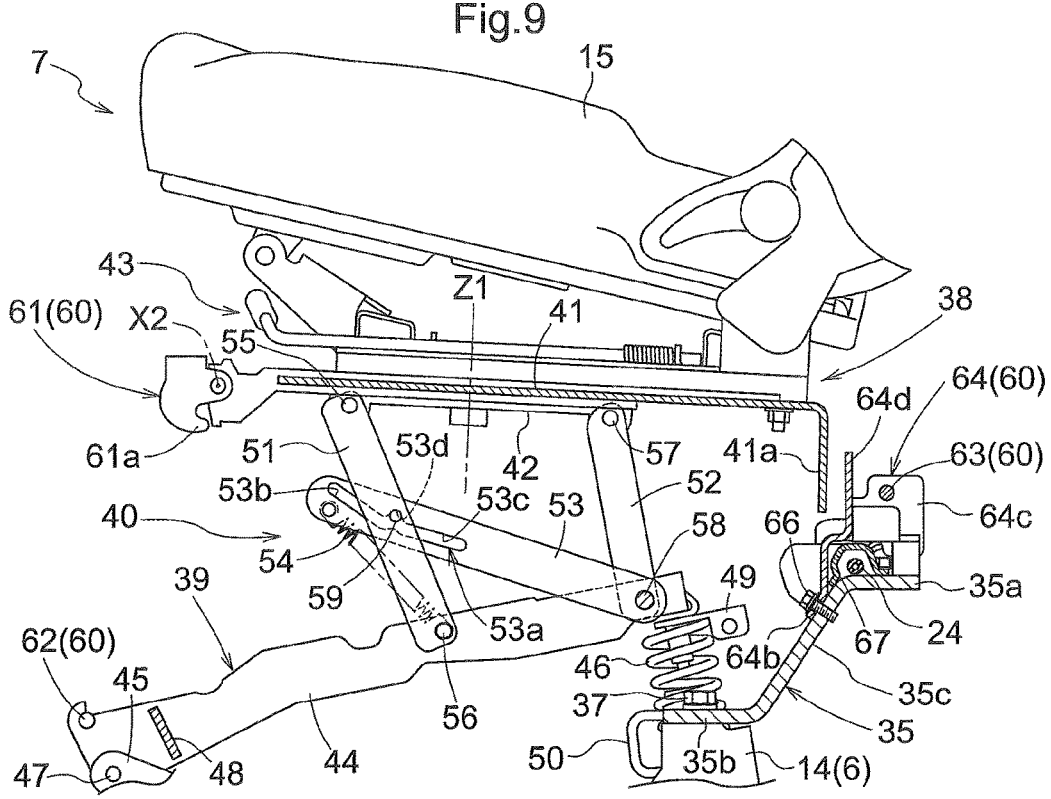
FIG. 9 is a left side view showing the driver's seat maintained at a reverse operational position.

The rotary table 38 includes a mounting table 41 and a base mount 42 (see FIG. 9, etc.). To the mounting table 41, the driver's seat 15 is mounted to be front/rear position-adjustable via a front/rear position adjusting mechanism 43. The mounting table 41 is supported by the base mount 42 to be rotatable about a rotational axis Z1.

The support frame 39 includes a pair of left and right pivotal frames 44, a pair of left and right front brackets 45 and a pair of left and right seat springs 46.

Each pivotal frame 44 is provided to be inclined forwardly downwards. The left pivotal frame 44 is pivotally supported by the left front bracket 45 at an upper end portion thereof via a left pin 47. The right pivotal frame 44 is pivotally supported to an upper end portion of the right front bracket 45 via a right pin 47. Each front bracket 45 is provided to extend upwards. The front bracket 45 is bolt-fixed to a lateral side of the HST 13.

A front connecting frame 48 is provided between a front end portion of the left pivotal frame 44 and a front end portion of the right pivotal frame 44. A rear connecting frame 49 is provided between a rear end portion of the left pivotal frame 44 and a rear end portion of the right pivotal frame 44. Seat springs 46 are attached to left and right end portions of the rear connecting frame 49, respectively. Stays 50 are provided for mounting and supporting the pair of seat springs 46, respectively. Each stay 50 is fixed with a bolt 37 to an upper portion of the transmission case 14.

The link mechanism 40 includes a pair of left and right front link arms 51, and further includes a rear link arm 52, a stopper arm 53 and a spring 54 associated therewith.

A front pivot shaft 55 extends between an end portion of the left front link arm 51 on the side of the rotary table 38 and an end portion of the right front link arm 51 on the side of the rotary table 38. Each of the left front link arm 51 and the right front link arm 51 is pivotally supported by the base mount 42 at a front end portion thereof via the front pivot shaft 55. The left front link arm 51 is pivotally supported by the left pivot frame 44 at a front/rear approximate center portion thereof via a left side pin 56. The right front link arm 51 is pivotally supported by the right pivot frame 44 at a front/rear approximate center portion thereof via a right side pin 56.

The rear link arm 52 is pivotally supported by the base mount 42 at a left/right center portion in the rear end portion thereof via a rear pivot shaft 57. A rear pivot shaft 58 extends between the rear end portion of the left pivotal frame 44 and the rear end portion of the right pivotal frame 44. The rear link arm 52 is pivotally supported by the rear pivot shaft 58 at a left/right center portion thereof. The stopper arm 53 is pivotally supported by the rear pivot shaft 58 at the left end portion thereof.

The spring 54 urges the stopper arm 53 pivotally downwards. The spring 54 is provided between a free end portion of the stopper arm 53 and the left side pin 56.

The stopper arm 53 defines a guide groove 53a for guiding a guide pin 59. The guide pin 59 is provided on the right side of the left front link arm 51. The guide groove 53a includes a front guide groove 53b, a rear guide groove 53c and a stopper groove 53d.

Locking Mechanism

Figure 7:
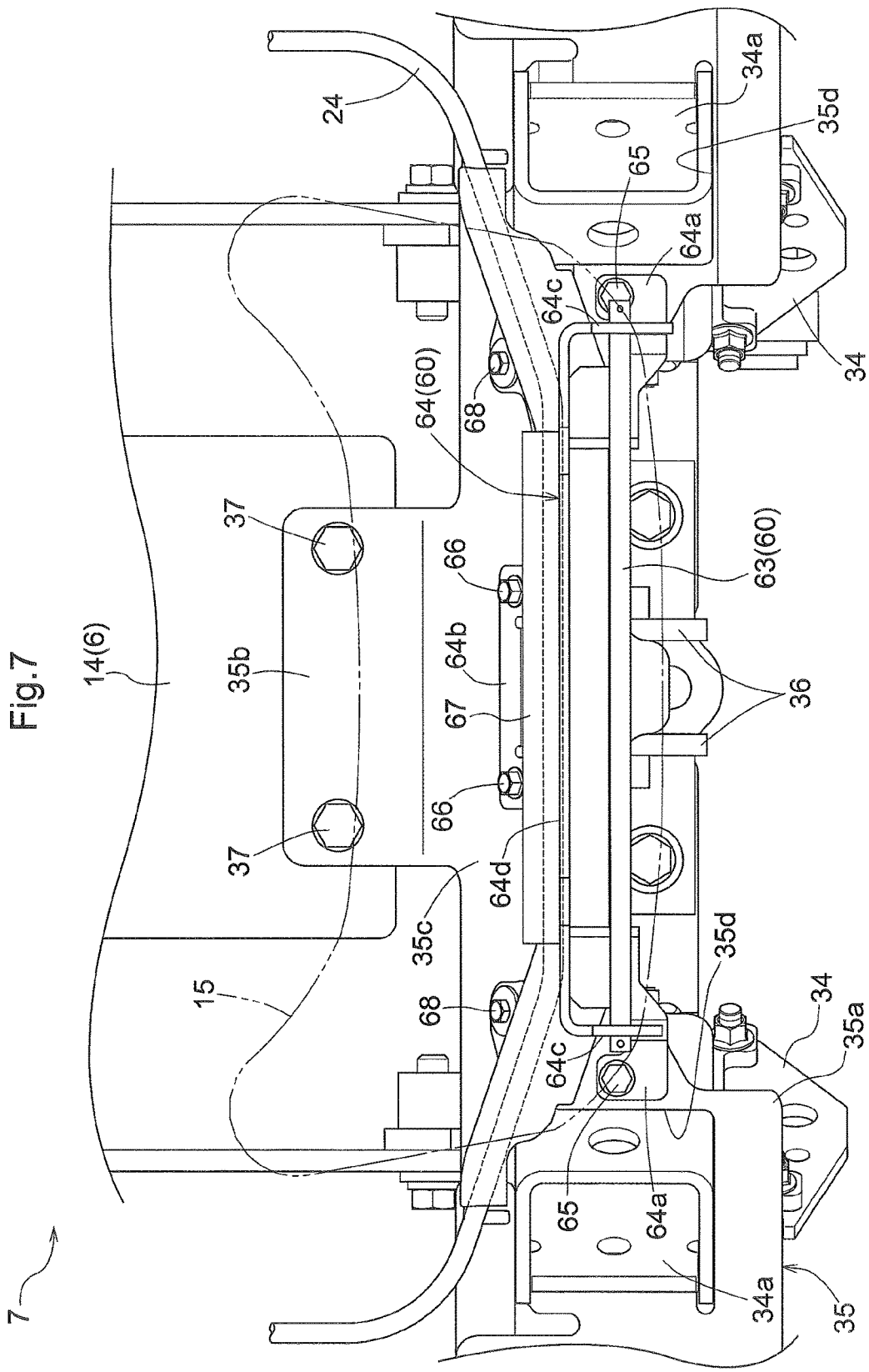
FIG. 7 is a plan view showing the top link bracket, the rod bracket, etc.
Figure 8:
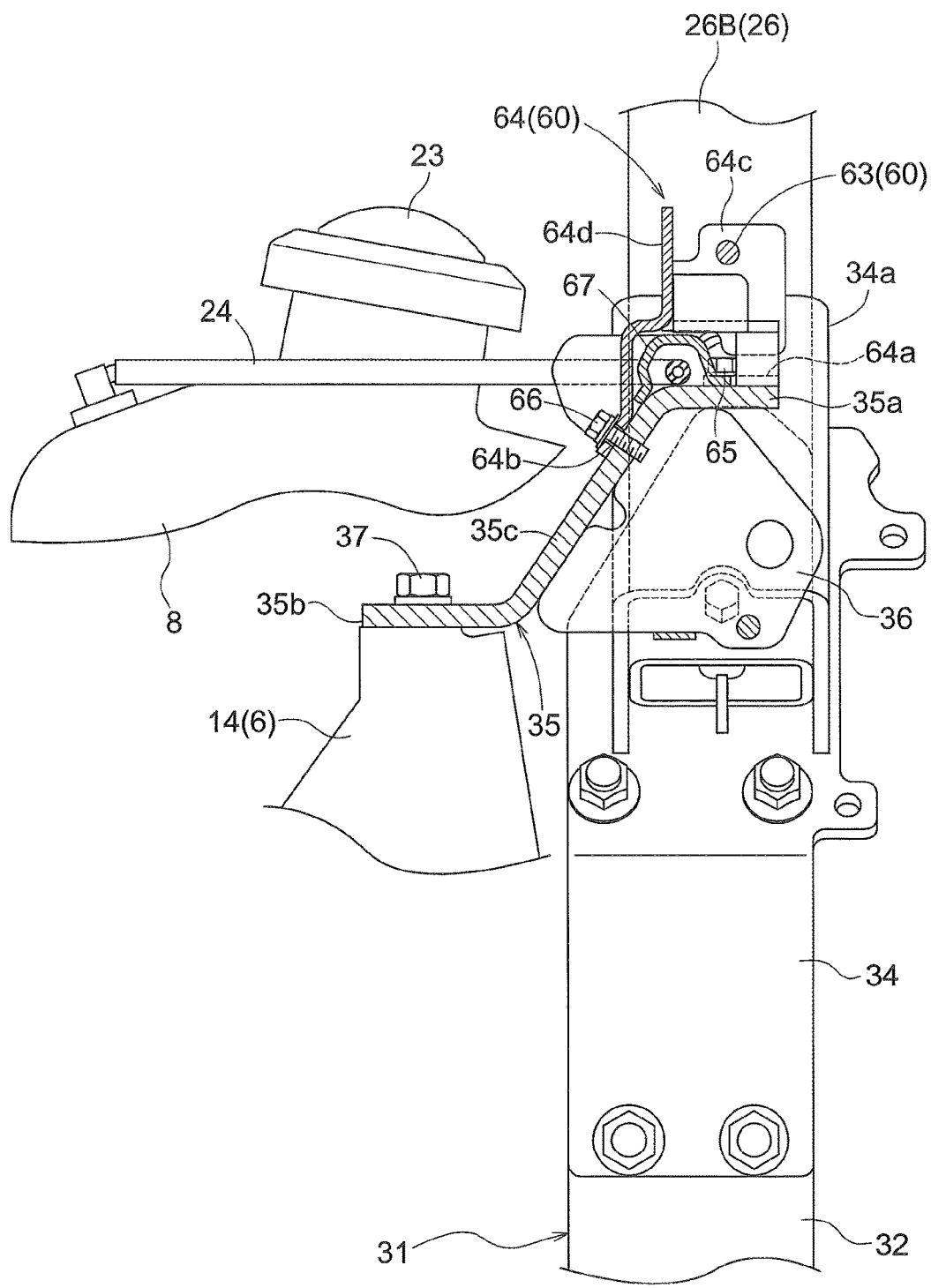
FIG. 8 is a left side view in section showing the top link bracket, the rod bracket, etc.

As shown in FIGS. 6-8, there is provided a locking mechanism 60 capable of fixing the driver' seat 15 under each of a front sealing posture and a rear seating posture. The locking mechanism 60 includes a hook 61, a pair of left and right hook pins 62, a hood rod 63 and a rod bracket 64.

The hook 61 is supported by the mounting table 41 to be pivotable about a pivot axis X2 that extends along the vehicle body left/right direction. A spring (not shown) is provided for pivotally urging the hook 61 about the pivot axis X2 downwards. The hook 61 includes a pair of left and right engaging portions 61a.

The left hook pin 62 is provided at the front end portion of the left pivotal frame 44 to extend along the vehicle body left/right direction. The left engaging portion 61a of the hook 61 is engageable with the left hook pin 62. The right hook pin 62 is provided at the front end portion of the right pivotal frame 44 to extend along the vehicle body left/right direction. The right engaging portion 61a of the hook 61 is engageable with the right hook pin 62.

The hook rod 63 is disposed between the lower portion 25B of the left strut 25 and the lower portion 25B of the right strut 26. The hook rod 63 comprises a bar-like member (e.g. a round bar member) extending along the vehicle body left/right direction. Each of the left engaging portion 61a and the right engaging portion 61a of the hook 61 is engageable with the hook rod 63.

As shown in FIGS. 4-8, the rod bracket 64 supports the hook rod 63. The rod bracket 64 is supported by the base 35. The rod bracket 64 is formed as a member separate from the left strut 25 and the right strut 26. The rod bracket 64 includes a pair of left and right transverse attaching portions 64a, a front attaching portion 64b, a pair of left and right supporting portions 64c and a stopper portion 64d.

The transverse attaching portions 64a are fixed to the upper horizontal face portion 35a of the base 35 with bolts 65. The front attaching portion 64b is fixed to the inclined face portion 35c of the base 35 with bolts 66. The hook rod 63 extends between and across the left supporting portion 64c and the right supporting portion 64c. The stopper portion 64d extends between and across the left supporting portion 64c and the right supporting portion 64c.

Fuel Tube Cover

A fuel tube cover 67 is provided for covering the fuel tube 24. The fuel tube cover 67 covers a portion of the fuel tube 24 which portion extends between the left inserting portion 34a and the right inserting portion 34a. The fuel tube cover 67 is disposed between the rod bracket 64 and the base 35. The fuel tube cover 67 is formed of a resin member, for instance. The fuel tube cover 67 is fixed to the inclined face portion 35c of the base 35 with a bolt 68.

Switchover of Driver's Seat Between Front Seating Posture and Rear Seating Posture As shown in FIG. 6, when the driver's seat 15 is switched to the front seating posture, the left engaging portion 61a of the hook 61 is engaged with the left hook pin 62 and the right engaging portion 61a of the hook 61 is engaged with the right hook pin 62. Whereby, the driver's seat 15 can be locked to the front seating posture by the locking mechanism 60. And, when the driver's seat 15 is switched to the front seating posture, the guide pin 59 is located within the front guide groove 53b.

Then, as shown in FIG. 9, when the hook 61 is disengaged from the hook pin 62, the driver's seat 15 can be now moved rearwards via the link mechanism 40. In association with the movement of the driver's seat 15 rearwards, the guide pin 59 is moved within the front guide groove 53b and then the guide pin 59 is positioned within the stopper groove 53d, whereby the guide pin 59 is engaged with the stopper groove 53d. With this, the link mechanism 40 is fixed under a state illustrated in FIG. 9. In this way, the driver's seat 15 can be fixed at a position (reverse operational position) for effecting reverse operation about the rotational axis Z1.

Figure 10:
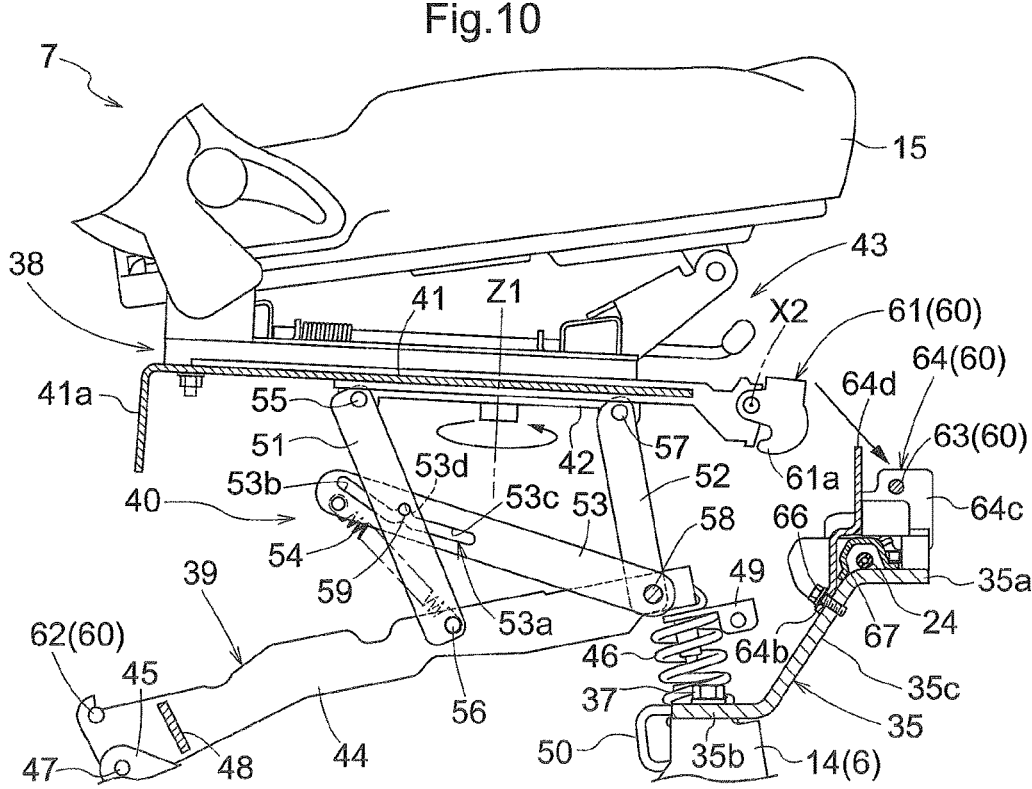
FIG. 10 is a left side view showing the driver's seat reversed at the reverse operational position.

Then, as shown in FIG. 10, while the driver's seat 15 is maintained at the reverse rotational position, the driver's seat 15 is rotated (reversed) about the rotational axis Z1 relative to the base mount 42 via the mounting table 41.

Figure 11:
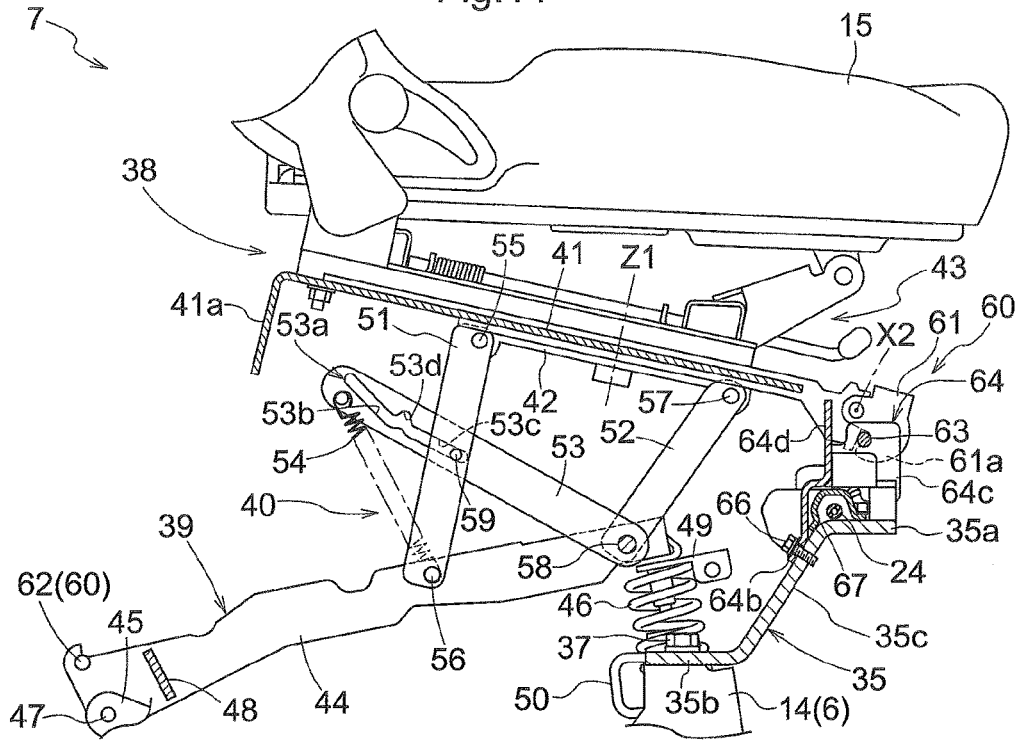
FIG. 11 is a left side view showing the driver's seat switched to a rear seating posture.

Then, as shown in FIG. 11, when the guide pin 59 is disengaged from the stopper groove 53d, the guide pin 59 will thereafter move within the rear guide groove 53c, whereby the driver's seat 15 can be moved rearwards via the link mechanism 40.

When the driver's seat 15 is switched to the rear seating posture, the left engaging portion 61a and the right engaging portion 61a of the hook 61 are engaged with the hook rod 63. In this way, the driver's seat 15 can be locked to the rear seating posture by the locking mechanism 60. When the driver's seat 15 is switched to the rear seating posture, the guide pin 59 is positioned within the rear guide groove 53c.

Incidentally, though not discussed in details, by an opposite procedure to the above, the driver's seat 15 can be switched from the rear seating posture (see FIG. 11) to the front seating posture (see FIG. 6).

Figure 12:
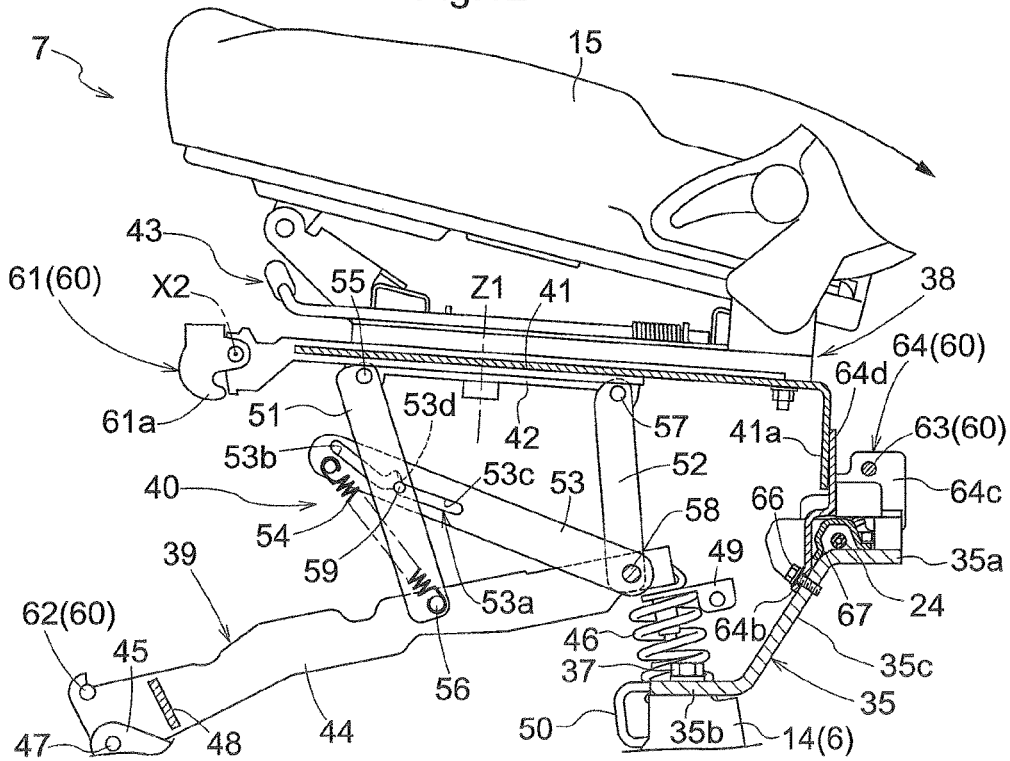
FIG. 12 is a left side view showing a state in which movement of the driver's seat to the rear side is restricted.

As shown in FIG. 12, if the driver's seat 15 is moved excessively to the rear side via the link mechanism 40 in the course of switchover of the driver's seat 15 from the front seating posture to the rear seating posture, the driver's seat 15 may hit some member present in the surrounding by accident. However, since a pair of left and right stopper portions 41a of the mounting table 41 come into contact with the stopper portion 64d from the front side thereof, such hitting of the driver's seat 15 against some member present in the surrounding due to excessive rearward movement of the driver's seat 15 in the course of switchover of the driver's seat 15 from the front seating posture to the rear seating posture can be prevented.

Routing Arrangement of Hydraulic Hoses

Figure 13:
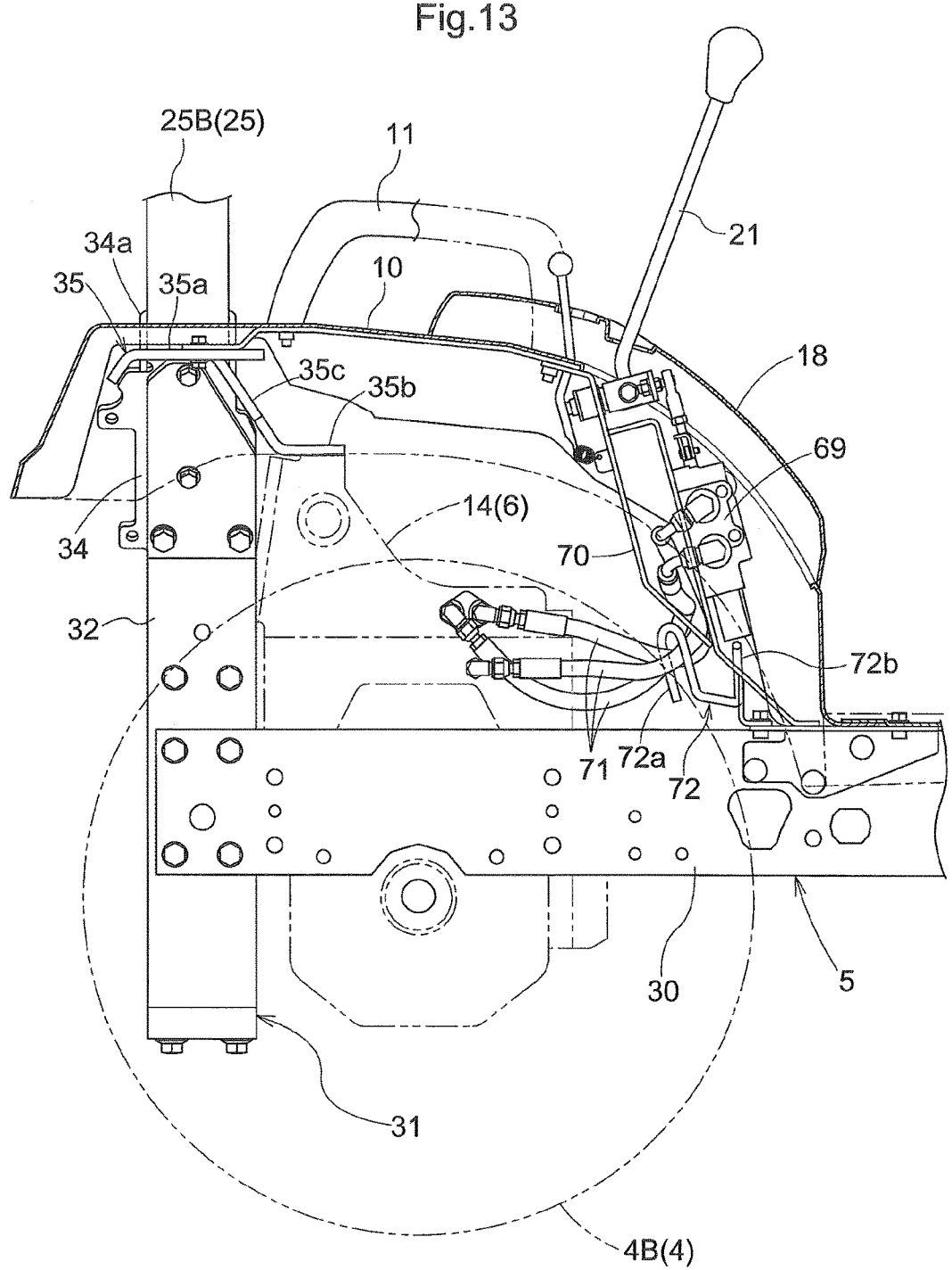
FIG. 13 is a left side view in section showing a routing arrangement of hydraulic hoses.
Figure 14:
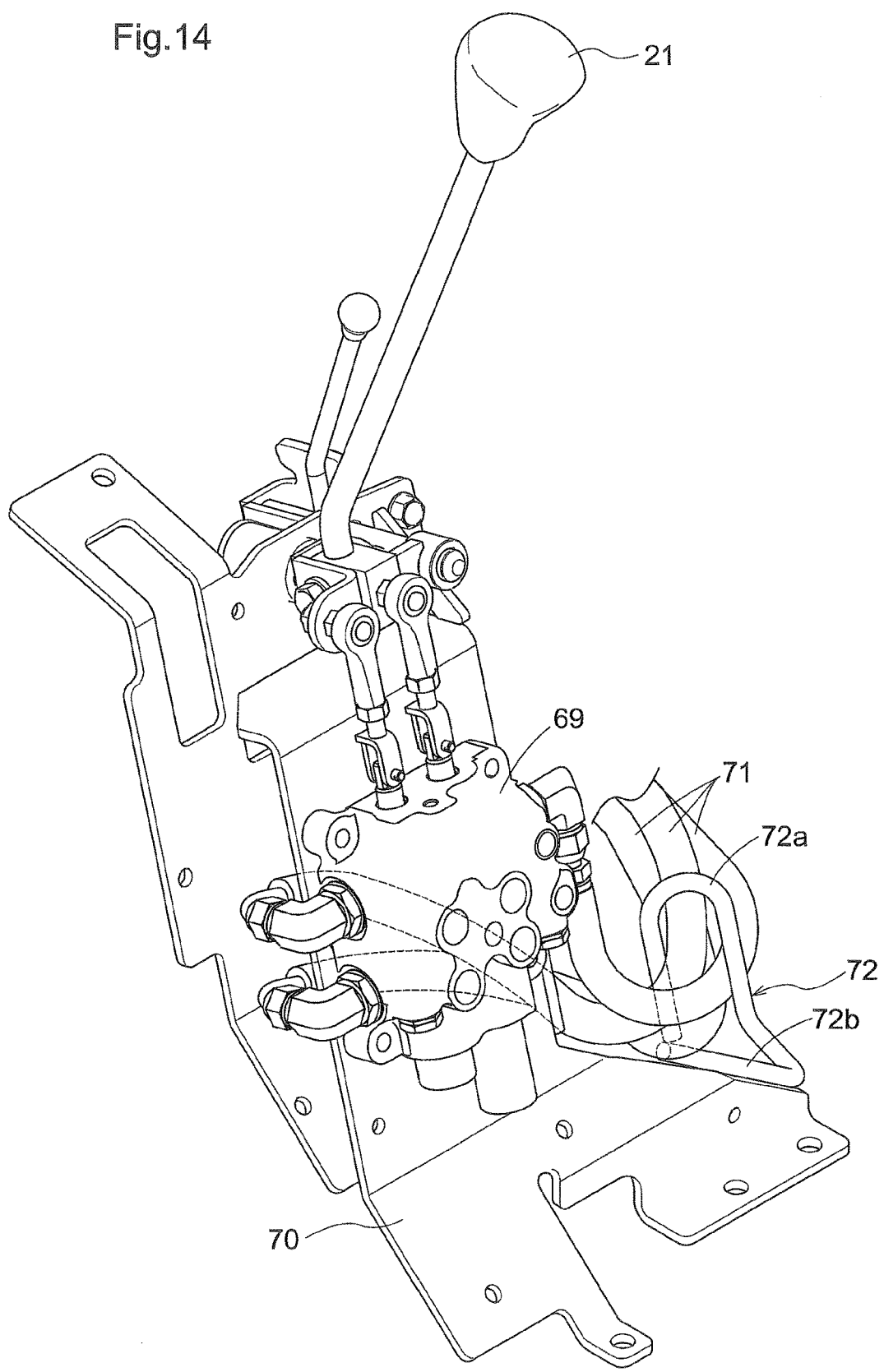
FIG. 14 is a perspective view showing the routing arrangement of the hydraulic hoses.

As shown in FIG. 13 and FIG. 14, the loader lever 21 is connected to a control valve 69. This control valve 69 controls operational oil to be supplied to the front loader 2. The loader lever 21 and the control valve 69 are supported to a stay 70. A plurality of hydraulic hoses 71 are provided between the control valve 69 and the transmission case 14.

A guide rod 72 is provided for bundling the hydraulic hoses 71 together. The guide rod 72 is constituted of e.g. a round bar member. The guide rod 72 is fixed to the stay 70 e.g. by welding. The guide rod 72 defines a hook portion 72a that can be hooked onto the hydraulic hoses 71 and a fixing portion 72b to be fixed to the stay 70. Laying routes of the plurality of hydraulic hoses 71 can be set at one time by the single guide rod 72.

Other Embodiments

Other embodiments of the present invention will be described next. It is understood that the respective other embodiments to be described next can be applied selectively in a plurality of combinations to the foregoing embodiment as long as no contradiction occurs therebetween.

(1) In the foregoing embodiment, the rod bracket 64 is supported by the base 35. Instead thereof, the rod bracket 64 can be supported by any other member than the base 35.

(2) In the foregoing embodiment, the stopper portion 64d is provided in the rod bracket 64 integrally therewith. Instead, the stopper portion 64d can be provided separately from the rod bracket 64.

(3) In the foregoing embodiment, a tractor was shown as an example of the work vehicle. However, the invention is not limited thereto. The invention can be applied also to a work vehicle having a grass mower.

What is claimed is:

1. A work vehicle comprising:
a traveling vehicle body having a vehicle body frame;
a driver's seat mounted on the traveling vehicle body, and configured to be switchable between a front seating posture in which a driver is seated as facing a vehicle body front side and a rear seating posture in which the driver is seated as facing a vehicle body rear side;
a rollover protection structure (ROPS) fixed to the vehicle body frame around the driver's seat, the ROPS having a left strut provided on a left side of the driver's seat to extend upwards and a right strut provided on a right side of the driver's seat to extend upwards; and
a locking mechanism configured to lock the driver's seat to the rear seating posture, the locking mechanism including a hook provided on a driver's seat side, a hook rod disposed between the left strut and the right strut and engageable with the hook when the driver's seat is switched to the rear seating posture, and a rod bracket for supporting the hook rod;
wherein the rod bracket is provided separately from the left strut and the right strut,
wherein the driver's seat is configured to move to a rear side in the vehicle body front/rear direction under the front seating posture and then switch to the rear seating posture when the driver's seat is switched from the front seating posture to the rear seating posture; and
wherein the rod bracket has a stopper portion provided integrally therewith for restricting movement of the driver's seat under the front seating posture to the rear side.

2. The work vehicle of claim 1, wherein the vehicle body frame includes a supporting member for supporting the ROPS; and the rod bracket is supported by the supporting member.

3. The work vehicle of claim 2, wherein the vehicle body frame includes a left vehicle body frame and a right vehicle body frame which extend in a vehicle body front/rear direction; and the supporting member is supported between the left vehicle body frame and the right vehicle body frame.

4. The work vehicle of claim 3, wherein the supporting member includes a U-shaped bracket having left and right leg portions attached between the left vehicle body frame and the right vehicle body frame, and a base attached to upper ends of the left and right leg portions and supporting the rod bracket.

5. The work vehicle of claim 1, wherein:
the rod bracket is elongated in a vehicle body left/right direction; and
the rod bracket includes, at each of its left and right end portions, an attaching portion for attaching the rod bracket to the vehicle body frame and a supporting portion for supporting the hook rod.

6. A work vehicle comprising:
a traveling vehicle body having a vehicle body frame;
a driver's seat mounted on the traveling vehicle body, and configured to be switchable between a front seating posture in which a driver is seated as facing a vehicle body front side and a rear seating posture in which the driver is seated as facing a vehicle body rear side;
a rollover protection structure (ROPS) fixed to the vehicle body frame around the driver's seat, the ROPS having a left strut provided on a left side of the driver's seat to extend upwards and a right strut provided on a right side of the driver's seat to extend upwards; and
a locking mechanism configured to lock the driver's seat to the rear seating posture, the locking mechanism including a hook provided on a driver's seat side, a hook rod disposed between the left strut and the right strut and engageable with the hook when the driver's seat is switched to the rear seating posture, and a rod bracket for supporting the hook rod;
wherein the rod bracket is provided separately from the left strut and the right strut, and
wherein the rod bracket is elongated in a vehicle body left/right direction.

7. A work vehicle comprising:
a traveling vehicle body having a vehicle body frame;
a driver's seat mounted on the traveling vehicle body, and configured to be switchable between a front seating posture in which a driver is seated as facing a vehicle body front side and a rear seating posture in which the driver is seated as facing a vehicle body rear side;
a rollover protection structure (ROPS) fixed to the vehicle body frame around the driver's seat, the ROPS having a left strut provided on a left side of the driver's seat to extend upwards and a right strut provided on a right side of the driver's seat to extend upwards; and
a locking mechanism configured to lock the driver's seat to the rear seating posture, the locking mechanism including a hook provided on a driver's seat side, a hook rod disposed between the left strut and the right strut and engageable with the hook when the driver's seat is switched to the rear seating posture, and a rod bracket for supporting the hook rod;
wherein the rod bracket is provided separately from the left strut and the right strut,
wherein the rod bracket is elongated in a vehicle body left/right direction, and
wherein the rod bracket includes, at each of its left and right end portions, an attaching portion for attaching the rod bracket to the vehicle body frame and a supporting portion for supporting the hook rod.

* * * * *